March 18, 1952  O. J. BULLINGER  2,589,770
DEVICE FOR MEASURING FRONT-WHEEL PLAY
Filed May 19, 1949
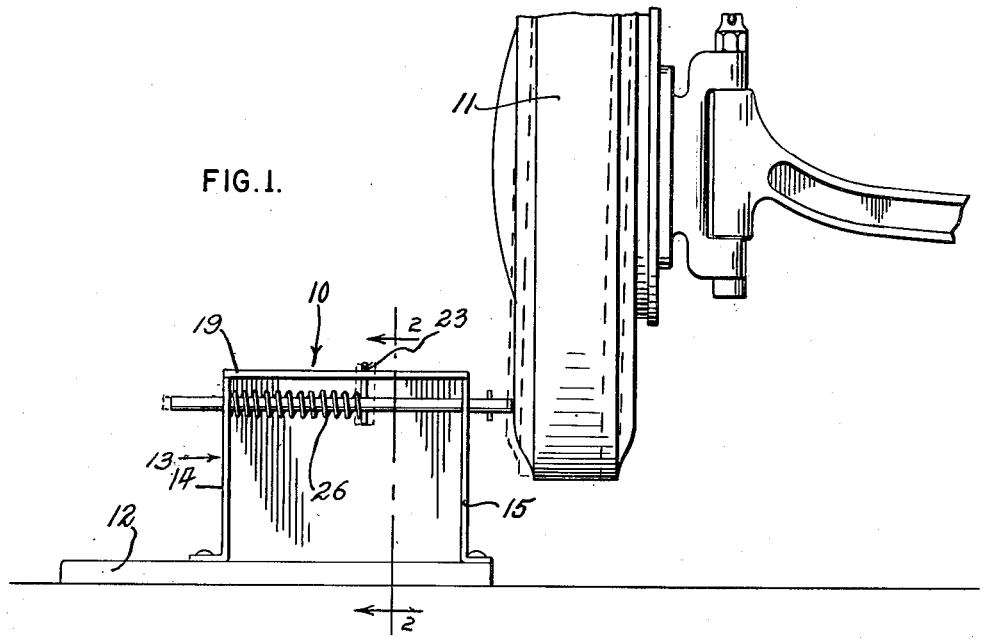
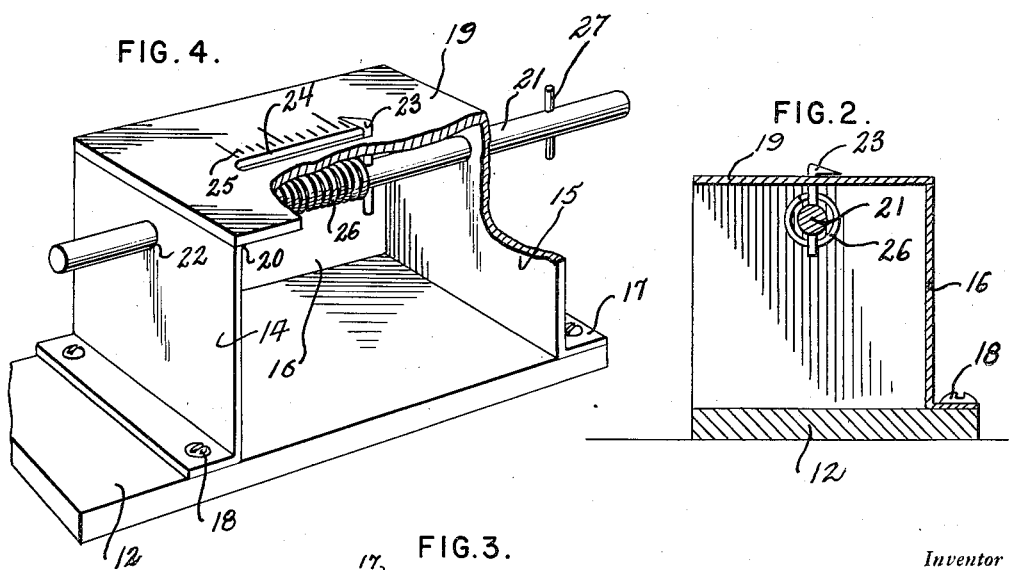
Inventor
Othmar J. Bullinger
By Jerome W. Paxton
Agt.

Patented Mar. 18, 1952

2,589,770

UNITED STATES PATENT OFFICE 2,589,770

DEVICE FOR MEASURING FRONT-WHEEL PLAY

Othmar J. Bullinger, Johnstown, Pa.

Application May 19, 1949, Serial No. 94,076

3 Claims. (Cl. 33—169)

1

The present invention relates to a measuring device, and more particularly has reference to a gauge adapted to measure the "looseness" of the steering wheels of motor vehicles.

It has always been a difficult task to measure with any reasonable degree of accuracy the looseness of the steering wheels. Generally, the mechanic checking the steering wheels after jacking up the front wheels would shake the wheel back and forth and endeavor to determine whether the wheel had too much play. In recent years, the majority of the States have installed rather rigid inspection requirements for motor vehicles and one of the important tests which a vehicle must pass is whether the play in the steering wheels is under a certain limit. For example, in the State of Pennsylvania, the steering wheels cannot have more than one-quarter of an inch of play. Consequently, it can be seen that the provision of a gauge which will measure accurately the play of the steering wheels is most desirable. Experience has demonstrated that where the mechanic tells the car owner after checking that there is too much play, the owner often questions the accuracy of the test and mechanics have often resorted to the use of an ordinary ruler to try and show the amount of play in the wheel. This, of course, is not only a tedious process, but by virtue of the human element involved, is additionally not entirely accurate.

Accordingly, an object of my invention is to provide a gauge which will overcome the above and other objectionable features which will quickly and accurately measure the amount of play in the wheel.

Another object of my invention is to provide a unit which is simple in structural detail, positive and efficient in operation and which can be quickly and inexpensively manufactured for gauging the looseness of steering wheels.

Yet another object of my invention is to provide a gauge wherein an indicating pointer carried by a longitudinally movable rod under spring action is adapted to be moved across a scale graduated in inches or parts of inches when the wheel engages the rod to indicate the looseness of the wheel.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:

Figure 1 is a view in side elevation showing the gauge in operative relation with respect to the front wheel of an automobile in the jacked up position.

Figure 2 is a vertical sectional view taken along the line 2—2 of Figure 1, looking in the direction of the arrows.

Figure 3 is a plan view of the gauge shown in Figure 1, and

Figure 4 is a view in perspective and partly broken away of the wheel gauge.

Referring to the drawings, and more particularly to Figure 1, the numeral 10 denotes generally the gauge assembly and one of the steering wheels of a motor vehicle is designated 11.

The gauge 10 comprises a rectangular base 12, preferably of wood, and a casing or housing 13 is supported by the base 12. The housing 13 comprises end walls 14 and 15 and a side wall 16. The lower end of each of the walls is flanged, as shown at 17, and the housing is secured to the base 12 by screws or the like 18 which extend through the flanges 17. A top or closure member 19 is attached to the upper ends of the walls 14, 15 and 16 by welding or the like, as shown at 20, although, of course, it is to be understood that the top 19 could have a depending flange which extends along the outer face of the walls, and a nut and bolt assembly may be used to secure the top to the walls. This construction is desirable in that it permits the ready and easy removal of the top from the walls.

A rod 21 extends longitudinally of the housing through openings 22 in the walls 14 and 15 at a point adjacent the top 19, and a pointer 23 is supported by the rod 21 and projects through an elongated slot 24 in the top 19 for cooperating with graduations 25 of a scale in inches or parts of inches provided adjacent the slot 24. A helical spring 26 surrounds the rod 21 and one end of the spring bears against the wall 14 while the opposite end engages the pointer 23. Manifestly, the spring 26 urges the pointer 23 toward the right hand end of the slot 24, as shown in Figures 1 and 4. In order to limit the inward movement of the rod 21, a stop pin 27 is fitted in an aperture provided in the vicinity of the outer end of the rod.

While the operation of the gauge is thought to be readily apparent, it may be briefly summarized as follows:

After the wheel 11 has been elevated to a point above the floor or ground, the wheel is preferably moved so that it is pointing directly forward and the base 12 is then moved to a position where the outer end of the rod 21 engages the side wall of the tire with the pointer 23 at the zero position. The mechanic then places his foot on the base 12 to prevent any displacement of the gauge and the wheel is moved outwardly which, of course, will move the rod 21 inwardly, and the pointer 23 will indicate the amount of looseness of the wheel. Hence, the mechanic can readily determine from the scale whether the wheel meets inspection standards and the automobile owner, of course, can likewise see clearly the play in the wheel.

Therefore, it will be appreciated that I have provided a gauge which consists of few essential working parts which permits the inexpensive manufacture of the unit and, in addition, will keep maintenance expenses to a minimum. The accuracy of the device enables unskilled personnel to employ it for checking purposes and this is, of course, of great importance to garages and similar establishments.

I have found that the following dimensions provide a highly satisfactory gauge:

| | |
|---|---|
| Base 12 | 18 inches long |
| Housing 13 | 5½ inches high |
| | 5 inches long |
| | 2 inches wide |
| Rod 21 | 8 inches long |
| | ⅜ inch in diameter |
| Stop 27 | located 1 inch from end of rod |

The invention is not to be confined to any strict conformity with the showing in the drawing but may be changed or modified so long as such changes or modifications mark no material departure from the salient features of the invention as expressed in the appended claims.

I claim:

1. In a device for measuring front wheel end play, a slidable contact rod adapted to engage a wheel, means slidably supporting said rod, a pointer supported solely by and movable with said rod, and indicia associated with said pointer for indicating the front end wheel play of a wheel in response to sliding movement of the rod as a wheel rides against one end of the rod, said indicia including parallel lines disposed transversely of said rod, said rod including a transverse bore, said pointer including a shank portion extending completely through said bore with ends exposed from the bore, and a spring embracing the rod and having one end seated against the ends of said shank portion and yieldingly urging the rod to a position to be engaged by a wheel.

2. In a device for measuring front wheel end play, an elongated foot plate, a substantially U-shaped support mounted on said plate at one end of said plate, said support including forward and rear vertical walls and a horizontal wall overlying the plate and joining said vertical walls, said forward wall having an opening therein and said rear wall having an opening in registry with the opening in said forward wall, a horizontally sliding contact bar received in said openings and paralleling said plate, said bar having a forward end portion projecting forwardly from the forward wall and a rear end portion projecting rearwardly from the rear wall, said bar having a transverse vertical bore therein, a horizontal pointer having a vertical shank portion extending through said bore, said shank having a lower end depending from said bar, a coil spring embracing said bar and having a rear end seated against said rear wall and a forward end seated against said shank portion including the lower end of said shank portion, said spring retaining said shank portion in said bore and yieldingly urging said bar forwardly of said support, the forward end portion of said bar having a transverse opening therein, and a stop pin in said transverse opening and having ends projecting from said transverse opening, said stop pin being normally spaced from said forward wall due to the action of said spring on said bar and said stop pin engaging said forward wall during rearward sliding movement of said bar to limit rearward sliding movement of said bar, and indicia on said horizontal wall for registering with said pointer.

3. In a device for measuring front wheel end play, an elongated foot plate, a substantially U-shaped support mounted on said plate at one end of said plate, said support including forward and rear vertical walls and a horizontal wall, overlying the plate and joining said vertical walls, said forward wall having an opening therein and said rear wall having an opening in registry with the opening in said forward wall, a horizontally sliding contact bar received in said openings and paralleling said plate, said bar having a forward end portion projecting forwardly from the forward wall and a rear end portion projecting rearwardly from the rear wall, said ba having a transverse vertical bore therein, a horizontal pointer having a vertical shank portion extending through said bore, said shank having a lower end depending from said bar, a coil spring embracing said bar and having a rear end seated against said rear wall and a forward end seated against said shank portion including the lower end of said shank portion, said spring retaining said shank portion in said bore and yieldingly urging said bar forwardly of said support, the forward end portion of said bar having a transverse opening therein, and a stop pin in said tranevsrse opening and having ends projecting from said transverse opening, said stop pin being normally spaced from said forward wall due to the action of said spring on said bar and said stop pin engaging said forward wall during rearward sliding movement of said bar to limit rearward sliding movement of said bar, said horizontal wall having an elongated slot therein paralleling said bar and slidably receiving the shank portion of said pointer, said pointer overlying said horizontal wall, and indicia on the upper face of said horizontal wall beneath said pointer.

OTHMAR J. BULLINGER.

REFERENCES CITED

The following references are of record in the file of this patent:

UNITED STATES PATENTS

| Number | Name | Date |
|---|---|---|
| 693,744 | Sears | Feb. 18, 1902 |
| 1,313,086 | Handley | Aug. 12, 1919 |
| 1,540,183 | Pearson | June 2, 1925 |
| 1,611,062 | Peebles | Dec. 14, 1926 |
| 1,679,224 | Maynard | July 31, 1928 |
| 2,350,432 | Verderber | June 6, 1944 |
| 2,508,849 | Williams | May 23, 1950 |